US012683500B2

(12) United States Patent
Wu et al.

(10) Patent No.: US 12,683,500 B2
(45) Date of Patent: Jul. 14, 2026

(54) CONVERSION CONTROL CIRCUIT AND METHOD FOR USE IN STACKABLE MULTIPHASE POWER CONVERTER

(71) Applicant: Richtek Technology Corporation, Hsinchu (TW)

(72) Inventors: Wei-Chuan Wu, Changhua (TW); Chih-Hao Yang, Tainan (TW); Li-Wen Fang, Taipei (TW); Ting-Jung Tai, Hsinchu (TW)

(73) Assignee: Richtek Technology Corporation, Hsinchu (TW)

( * ) Notice: Subject to any disclaimer, the term of this patent is extended or adjusted under 35 U.S.C. 154(b) by 335 days.

(21) Appl. No.: 18/537,844

(22) Filed: Dec. 13, 2023

(65) Prior Publication Data

US 2025/0079984 A1 Mar. 6, 2025

(30) Foreign Application Priority Data

Aug. 30, 2023 (TW) ................................. 112132893

(51) Int. Cl.
*H02M 3/158* (2006.01)
(52) U.S. Cl.
CPC ....... *H02M 3/1584* (2013.01); *H02M 3/1586* (2021.05)

(58) Field of Classification Search
CPC .......................... H02M 3/1584; H02M 3/1586
See application file for complete search history.

(56) References Cited

U.S. PATENT DOCUMENTS

| | | | |
|---|---|---|---|
| 10,381,918 B1 * | 8/2019 | Stoichita ................. | H02M 1/15 |
| 2006/0239046 A1 * | 10/2006 | Zane ....................... | H02J 1/106 |
| | | | 363/65 |
| 2023/0091808 A1 * | 3/2023 | Philbrick ............ | H02M 3/1584 |
| | | | 323/272 |

* cited by examiner

*Primary Examiner* — Alex Torres-Rivera
(74) *Attorney, Agent, or Firm* — Huan-Yi Lin

(57) ABSTRACT

A conversion control circuit controls plural stackable sub-converters which are coupled in parallel to generate an output power to a load. The conversion control circuit includes a current sharing terminal and a current sharing circuit. A current sharing signal is connected, in parallel, to the current sharing terminals. The current sharing circuit includes: configuration (1): the current sharing signal is generated only according to an inductor current corresponding to one of plural inductors of the plural stackable sub-converters; or configuration (2): the current sharing signal is generated according to plural inductor currents corresponding to plural inductors of plural activated phases of the plural stackable sub-converters, wherein a ratio of a portion of the current sharing signal generated by a master control circuit to a portion generated by one of the slave control circuits is k which relates to a difference between a total phase number and an activated phase number.

17 Claims, 7 Drawing Sheets

CONVERSION CONTROL CIRCUIT AND METHOD FOR USE IN STACKABLE MULTIPHASE POWER CONVERTER

CROSS REFERENCE

The present invention claims priority to the TW patent application No. 112132893, filed on Aug. 30, 2023.

BACKGROUND OF THE INVENTION

Field of Invention

The present invention relates to a conversion control circuit, particularly to a conversion control circuit for a stackable multi-phase power converter. The invention also relates to a method for controlling the stackable multi-phase power converter.

Description of Related Art

Stackable multi-phase power converters provide efficient DC/DC power conversion to meet the demands of high load currents and rapid transient responses. Therefore, in high-performance computing (HPC) applications, stackable multi-phase power converters are widely used in areas such as CPUs, GPUS, and artificial intelligence. As the load current increases, the number of phases in the stackable multi-phase power converter increases. On the other hand, during light loads, the number of phases decreases to save energy.

FIG. 1 shows a prior art stackable multi-phase power converter. The stackable multi-phase power converter 1001 in FIG. 1 includes sub-converters 910, 920, 930, 940, configured to convert the input voltage VIN to generate the output voltage VO to the load 99. Each sub-converter 910, 920, 930, 940 includes a sync terminal Y #, an identification terminal ID #, and a current sharing terminal IS #. The sync terminal Y # is configured to transmit or receive sync signals SYNC, the identification terminal ID # is configured to set the phase sequence of the sub-converters 910, 920, 930, 940, and the current sharing terminal IS # is configured to transmit or receive current sharing signals IBUS. The sub-converters 910, 920, 930, 940 generate inductor currents IL1, IL2, IL3, IL4, thereby generating the output current ISUM.

FIG. 2 shows a circuit schematic of a prior art stackable multi-phase power converter. As shown in FIG. 2, sub-converters 910, 920, 930, 940 include current sharing circuits (shown as CSCkt) 911, 921, 931, 941 respectively. The current sharing circuits 911, 921, 931, 941 respectively include currents IS11, IS21, IS31, IS41, and resistors R1, R2, R3, R4, wherein currents IS11, IS21, IS31, IS41 are generated according to the inductor currents IL1-IL4 of sub-converters 910, 920, 930, 940. Currents IS11, IS21, IS31, IS41 are respectively coupled with resistors R1, R2, R3, R4 to corresponding respective current sharing terminals. The current sharing terminals are all connected in parallel, generating a current sharing signal IBUS. Each of the transconductance amplifier 9N (N is the phase sequence, such as 91, 92, 93, 94) of sub-converters 910, 920, 930, 940 compares the current sharing signal IBUS with the corresponding sub-converter's sub-current sensing signal VISN (N is the phase sequence, such as VIS1, VIS2, VIS3, VIS4), so as to generate an adjustment signal Vadj to adjust parameters such as the duty cycle of the sub-converter of the corresponding phase, thus achieving current sharing between the sub-converters of multiple phases. The sub-current sensing signals VISN are generated according to the corresponding sensing current ISN (N is the phase sequence, such as IS1, IS2, IS3, IS4) and the resistors R.

The drawback of the aforementioned prior art is that when the output current ISUM decreases to a certain level (e.g., when the load 99 transitions to light load), causing a reduction in the activated phase number, it leads to an imbalance in the current sharing signal IBUS. Consequently, the stackable multi-phase power converter fails to achieve a balance of current sharing. For example, as shown in FIG. 2, the stackable multi-phase power converter includes 4-phase sub-converters. When the output current ISUM decreases, reducing the activated phase number from 4 phases to 3 phases (e.g., when current IS41 becomes 0), the voltage of the current sharing signal IBUS is as follows according to Equation 1:

$$IBUS = (IS11 + IS21 + IS31) \times Req \qquad \text{(Eq. 1)}$$

wherein Req is an equivalent resistance value of resistors R1, R2, R3, and R4 connected in parallel.

From the above Equation 1, IBUS voltage is influenced only by the remaining three phases, causing an imbalance in the current sharing signal. Tt is evident that a reduction in the activated phase number will cause an imbalance in the current sharing signal IBUS, at least during transient phases. This, in turn, prevents the stackable multi-phase power converter from achieving a balance state of current sharing. Additionally, it may lead to unnecessary overshooting or undershooting of current or voltage.

SUMMARY OF THE INVENTION

From one perspective, the present invention provides a conversion control circuit for controlling a stackable sub-converter, wherein a plurality of the stackable sub-converters are configured as a stackable multi-phase power converter, wherein each of the plurality of the stackable sub-converters includes a power stage circuit and a corresponding conversion control circuit, wherein a plurality of the power stage circuits corresponding to the plurality of the stackable sub-converters are coupled in parallel to generate an output power to a load, the output power including an output current, wherein the conversion control circuit is configured to control at least one switch of the power stage circuit to switch a corresponding inductor, thereby generating the output power, wherein the conversion control circuit is configured as a master control circuit or a slave control circuit, wherein the plurality of the stackable sub-converters have a total phase number and an activated phase number, wherein the activated phase number is determined according to a level of the output current, wherein the conversion control circuit comprises: a current sharing terminal, wherein a current sharing signal is coupled to the current sharing terminals of the plural conversion control circuits that are coupled in parallel; a current sharing circuit, configured to generate and/or receive the current sharing signal, and to generate an adjustment signal according to a difference between the current sharing signal and a corresponding sub-current sensing signal to adjust at least one parameter of the conversion control circuit for current sharing between the plurality of the stackable sub-converters, wherein the sub-current sensing signal is related to an inductor current corresponding to the inductor; wherein the current sharing circuit includes the following configurations: (A): wherein the current sharing signal is generated only according to the corresponding inductor current of one of the plural inductors of the plurality of the stackable sub-converters; or (B): wherein the current sharing signal is generated according to the plural inductor currents corresponding to the plural inductors of plural activated phases of the plurality of the stackable sub-converters, wherein a ratio of a portion of the current sharing signal generated by a master control circuit to a portion generated by each activated one of the slave control circuit or the slave control circuits is k which relates to a difference between a total phase number and the activated phase number.

In one embodiment, in configuration (A), the current sharing signal is generated only according to the inductor current corresponding to the master control circuit.

In one embodiment, the current sharing circuit of the master control circuit does not generate the adjustment signal and does not adjust the at least one parameter of the conversion control circuit, wherein the current sharing circuit of each slave control circuit generates the adjustment signal to adjust the corresponding at least one parameter for current sharing between the plurality of the stackable sub-converters.

In one embodiment, in the configuration (B), the current-sharing circuit of each of the master control circuit and the slave control circuit generates the corresponding adjustment signal to correspondingly adjust at least one parameter, for current sharing between the plurality of the stackable sub-converters.

In one embodiment, the conversion control circuit controls at least one switch of one of the plurality of the stackable sub-converters using a constant time, wherein the constant time is determined according to a threshold voltage, an integral capacitance value, or an integral current; wherein the adjustment signal is configured to adjust the at least one parameter to modify the constant time for current sharing between the plurality of the stackable sub-converters, wherein the at least one parameter includes at least one of the threshold voltage, the integral capacitance value, and the integral current.

In one embodiment, the conversion control circuit further comprises a transconductance circuit and a filtering circuit, wherein the transconductance circuit is configured to generate a transconductance current according to the difference between the corresponding sub-current sensing signal and the current sharing signal, and the filtering circuit is configured to generate an amplified output signal according to the transconductance current, wherein the adjustment signal corresponds to the amplified output signal, and the amplified output signal corresponds to the threshold voltage.

In one embodiment, the conversion control circuit further comprises: a sync terminal, wherein a sync signal is coupled to the sync terminals of the plural conversion control circuits that are coupled in parallel; wherein the sync signal includes plural pulses, the plural pulses are continuously counted as a counting value, wherein the sync signal includes a reset signal for resetting and initiating the counting value; wherein when the counting value is related to a phase sequence number corresponding to the conversion control circuit, the conversion control circuit enables the corresponding power stage circuit to generate the output power; wherein the master control circuit is configured to generate the sync signal via the sync terminal, and the slave control circuit is configured to receive the sync signal via the sync terminal.

In one embodiment, when the counting value reaches the activated phase number, the reset signal is generated, wherein one pulse of the sync signal with a higher voltage level is indicative of the reset signal.

In one embodiment, the stackable sub-converter is activated by the triggering of the corresponding pulse of the sync signal.

In one embodiment, the conversion control circuit is configured as an integrated circuit, wherein the sync terminal corresponds to a sync pin of the integrated circuit, and the current sharing terminal corresponds to a current sharing pin of the integrated circuit.

From another perspective, the present invention provides a control method, for controlling a stackable sub-converter, wherein a plurality of the stackable sub-converters are configured as a stackable multi-phase power converter, wherein each of the plurality of the stackable sub-converters includes a power stage circuit, wherein a plurality of the power stage circuits corresponding to the plurality of the stackable sub-converters are coupled in parallel to generate an output power to a load, wherein the power stage circuit includes at least one switch for switching a corresponding inductor, thereby generating the output power, wherein one of the plurality of the stackable sub-converters is configured as a master stackable sub-converter, and each other of the plurality of the stackable sub-converters is configured as a slave stackable sub-converter, wherein the plurality of the stackable sub-converters have a total phase number and an activated phase number, wherein the control method comprises: controlling the at least one switch of the power stage circuit for switching the corresponding inductor; generating or receiving a current sharing signal by each of the plurality of the stackable sub-converters; and performing current sharing between the plurality of the stackable sub-converters according to the current sharing signal; wherein the step of generating the current sharing signal includes the following configurations: (A): generating the current sharing signal only according to the corresponding inductor current of one of the plural inductors of the plurality of the stackable sub-converters; or (B): generating the current sharing signal according to the plural inductor currents corresponding to the plural inductors of plural activated phases of the plurality of the stackable sub-converters, wherein a ratio of a portion of the current sharing signal generated by a master control circuit to a portion generated by each activated one of the slave control circuit or the slave control circuits is k which relates to a difference between a total phase number and the activated phase number.

The present invention provides a control circuit for controlling a stackable multi-phase power converter, which can continuously achieve current sharing even when there is a change in the activated phase number of the stackable multi-phase power converter. It remains unaffected by variations in the activated phase number, resulting in advantages such as energy savings, high efficiency, and stable output current and voltage.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
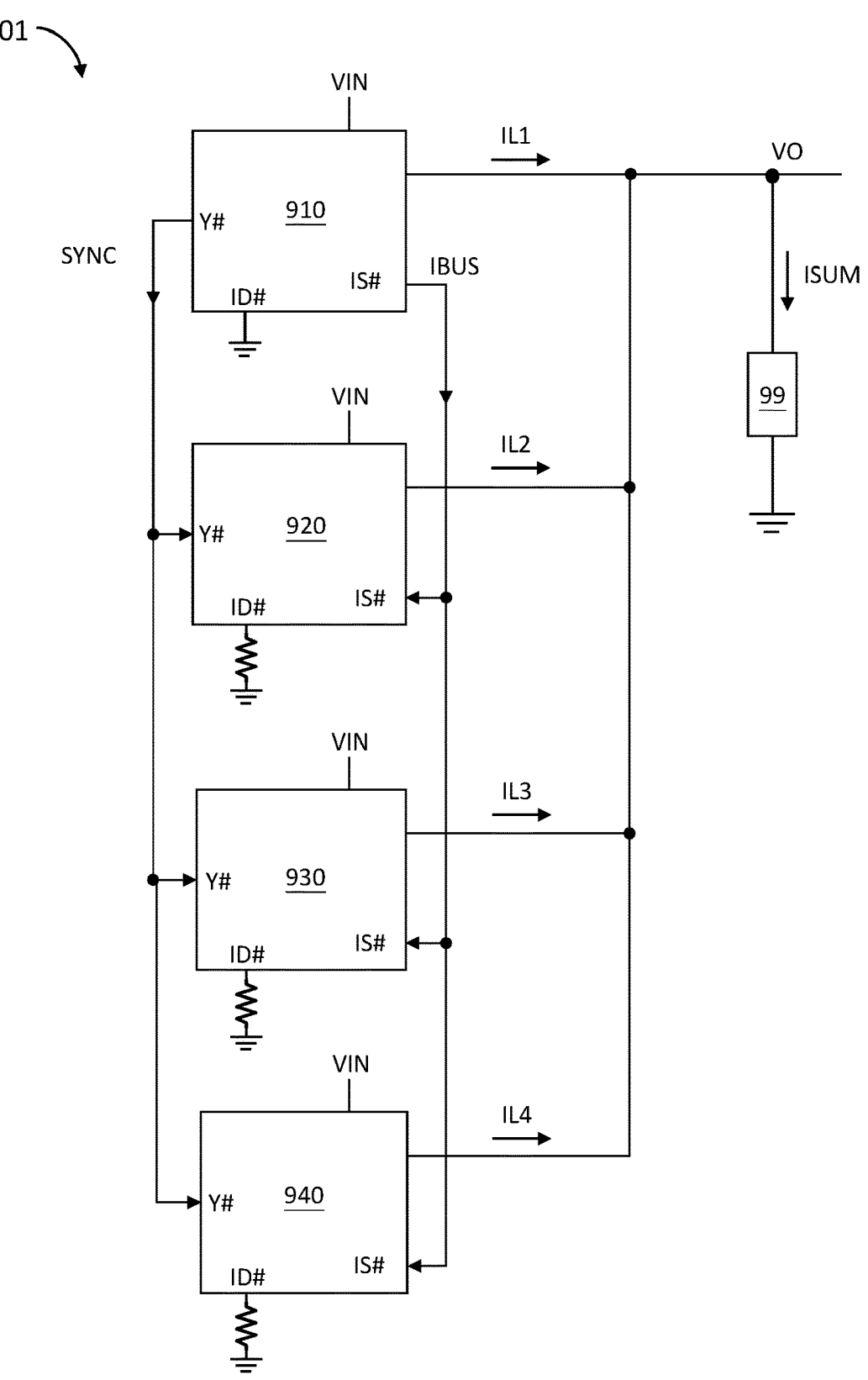
FIG. 1 illustrates a block diagram of a stackable multi-phase power converter in the prior art.
Figure 2:
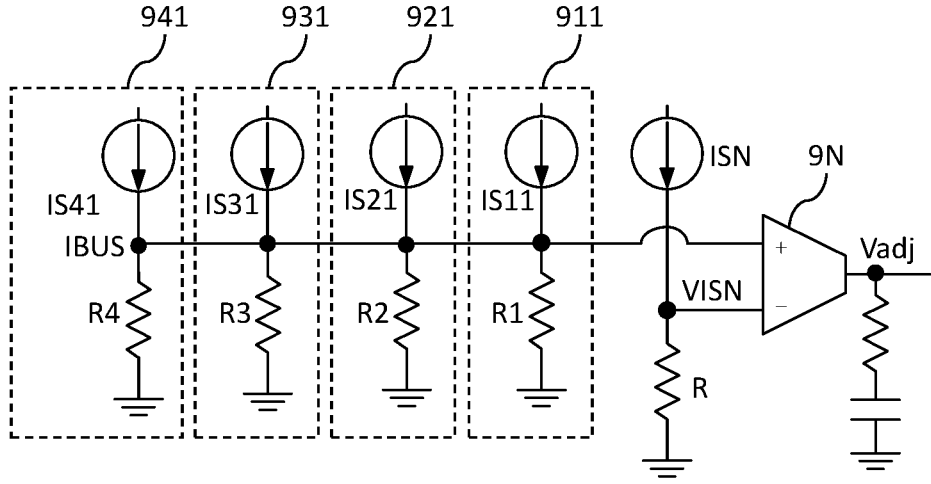
FIG. 2 depicts a circuit schematic diagram of a prior art stackable multi-phase power converter.
Figure 3:
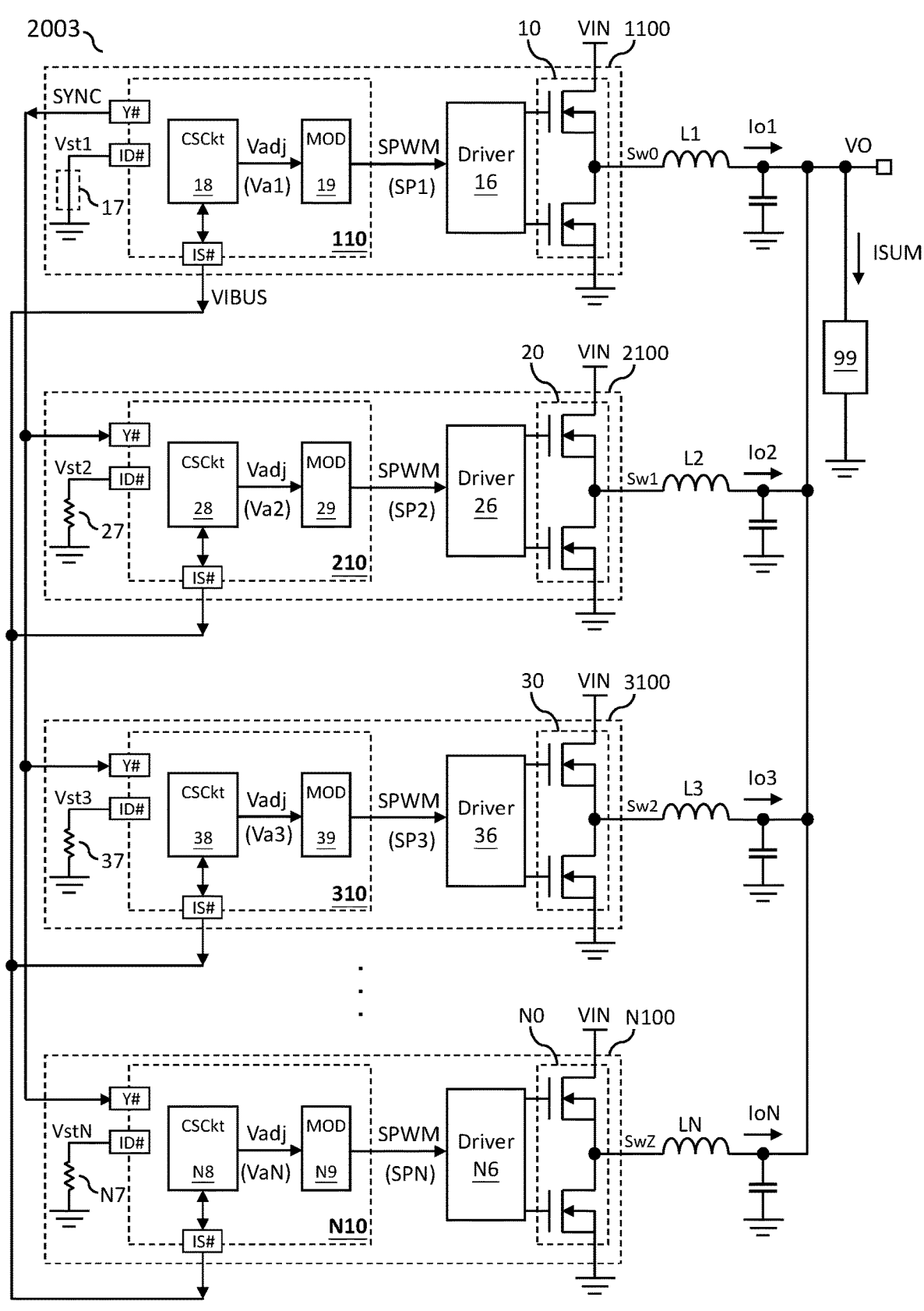
FIG. 3 presents a schematic diagram of one embodiment of the conversion control circuit in a stackable multi-phase power converter according to the present invention.

FIG. 3 illustrates a schematic diagram of one embodiment of the stackable multi-phase power converter according to the present invention. In one embodiment, the stackable multi-phase power converter 2003 includes N stackable sub-converters 1100-N100 (e.g., 1100, 2100, 3100, . . . . N100), where N is an integer greater than 1, the same hereinafter. In one embodiment, the stackable sub-converters 1100, 2100, 3100-N100 comprise power stage circuits 10, 20, 30-N0 respectively. The power stage circuits 10, 20, 30-N0 are coupled in parallel to generate an output power (e.g., corresponding to the output voltage VO) to the load 99. The output power includes an output current ISUM. In one embodiment, the power stage circuits 10, 20, 30-N0 operate in interleaved phases. Specifically, the power stage circuits 10, 20, 30-N0 are configured to switch the inductors L1, L2, L3, and LN to generate corresponding inductor currents Io1, Io2, Io3-ION, achieving interleaved switching power conversion. The aforementioned N is an integer greater than 1, the same hereinafter.

In one embodiment, the power stage circuit is a buck converter. However, this is not intended to limit the scope of the present invention. The power stage circuit can also be configured as other switching power converters, such as boost converters, buck-boost converters, flyback converters, and the like.

In one embodiment, the stackable sub-converters 1100, 2100, 3100-N100 further include corresponding conversion control circuits 110, 210, 310-N10 respectively. These control circuits are designed to control at least one switch in their corresponding power stage circuit, thereby switching the respective inductors to generate the output power. In one embodiment, the stackable multi-phase power converter 2003 also includes a corresponding number of drivers (16, 26, 36-N6), where each driver is respectively coupled between the corresponding conversion control circuit and power stage circuit to drive the power stage circuit for switching.

In one embodiment, each conversion control circuit 110, 210, 310-N10 is programmable to be configured as a master control circuit or a slave control circuit. The interleaved phase sequence number is also programmable. Still referring to FIG. 3, in one embodiment, each conversion control circuit 110, 210, 310-N10 includes an identification terminal ID #, configured to set the phase sequence number ID_Z. In one embodiment, a resistor and a constant current source in the conversion control circuit are configured to determine the phase sequence number ID_Z of the conversion control circuit. The constant current sources in respective conversion control circuits 110, 210, 310-N10 are respectively coupled to set resistors 17, 27, 37-N7 through their corresponding identification terminals ID #, thereby generating voltages Vst1, Vst2, Vst3-VstN. The voltage levels of Vst1, Vst2, Vst3-VstN determine the phase sequence number ID_Z of the corresponding conversion control circuit.

In one embodiment, the identification terminal ID # of the conversion control circuit 110 is coupled to the ground potential to set its phase sequence number ID_Z to 0 (i.e., resistor 17 can be omitted and short-circuited). In one embodiment, the phase sequence number ID_Z is further configured to determine whether the conversion control circuit is configured as a master control circuit or a slave control circuit. In one embodiment, the identification terminal ID # of the conversion control circuit 110 is coupled to the ground potential to set its phase sequence number ID_Z to 0, thereby configuring the conversion control circuit 110 as the master control circuit. In one embodiment, the relationship between the resistances R27, R37, RN7 of resistors 27, 37, N7 is: R27<R37<RN7, thereby setting the phase sequence numbers ID_Z of the conversion control circuits 210, 310, N10 to 1, 2, 3, respectively. In one embodiment, phase sequence numbers ID_Z other than 0 (master control circuit) will determine that the conversion control circuit (e.g., 210, 310, N10) functions as a slave control circuit.

Please continue to refer to FIG. 3. In one embodiment, each conversion control circuit 110, 210, 310-N10 includes a synchronization terminal Y #, configured to transmit or receive the synchronization signal SYNC. In one embodiment, all synchronization terminals (i.e., Y # the synchronization terminals Y # of the conversion control circuits 110, 210, 310-N10) are coupled to each other. From another perspective, all synchronization terminals Y # are coupled in parallel, i.e., the synchronization signal SYNC is coupled to the plural synchronization terminals Y # of the plural conversion control circuits (110, 210, 310-N10). In one embodiment, the master control circuit (i.e., the conversion control circuit 110) generates and transmits the synchronization signal SYNC via the corresponding synchronization terminal Y #. On the other hand, the slave control circuits (i.e., the conversion control circuits 210, 310-N10) receive the synchronization signal SYNC from their respective synchronization terminals Y #.

In one embodiment, the identification terminal ID # of the conversion control circuit in the stackable multi-phase power converter 2003 can be omitted. In one embodiment, the phase sequence number ID_Z can be set by other means, such as: pre-programmed one-time or multi-time programmable memory circuits or digital communication interfaces (such as I2C).

Please refer to FIG. 3. In one embodiment, the plural stackable sub-converters have a total phase number and an activated phase number, where the activated phase number is determined according to the level of the output current. For example, in one embodiment, when N is equal to 4, the stackable sub-converters 1100, 2100, 3100-N100 have a total phase number of 4 and an activated phase number (less than or equal to 4), which is determined according to the level of the output current ISUM. When the output current ISUM increases, the activated phase number also increases; when the output current ISUM decreases, the activated phase number decreases.

In one embodiment, each conversion control circuit 110, 210, 310-N10 further includes a current sharing terminal IS #. The conversion control circuits 110, 210, 310-N10 respectively include current sharing circuits 18, 28, 38-N8, and modulation circuits (shown as MOD) 19, 29, 39-N9. In one embodiment, the current sharing circuits 18, 28, 38-N8 are configured to generate and/or receive the current sharing signal VIBUS, wherein the current sharing signal VIBUS is coupled to the current sharing terminals IS # of the conversion control circuits 110, 210, 310-N10 coupled in parallel to each other.

In one embodiment, the current sharing circuits are further configured to generate an adjustment signal Vadj according to the difference between the current sharing signal VIBUS and the corresponding sub-current sensing signal VISN. The modulation circuit is configured to generate a modulation signal SPWM according to the adjustment signal Vadj. Specifically, the current sharing circuits 18, 28, 38-N8 are configured to generate respective adjustment signals Va1, Va2, Va3-VaN according to the difference between the current sharing signal VIBUS and the corresponding sub-current sensing signal VISN. These adjustment signals Va1, Va2, Va3-VaN adjust at least one parameter of the corresponding conversion control circuits 110, 210, 310-N10, so as to adjust corresponding modulation signals SP1, SP2, SP3-SPN of the modulation circuits 19, 29, 39-N9, enabling current sharing between the stackable sub-converters 1100, 2100, 3100-N100.

In one embodiment, the conversion control circuit (e.g., N10) can be configured as an integrated circuit, where the sync terminal Y # corresponds to the synchronous pin of the integrated circuit, and the current sharing terminal IS # corresponds to the current sharing pin of the integrated circuit. In one embodiment, the conversion control circuit and the driver (e.g., N6) can be integrated into a single integrated circuit. Alternatively, the conversion control circuit, driver, and power stage circuit (e.g., N0) can be integrated into a single integrated circuit.

It should be noted that, in the embodiment of FIG. 3, the current sharing circuit 18, 28, 38-N8 can be configured as specific embodiments shown in FIG. 4 or FIG. 5, and each of these two specific embodiments will be explained separately.

Figure 4:
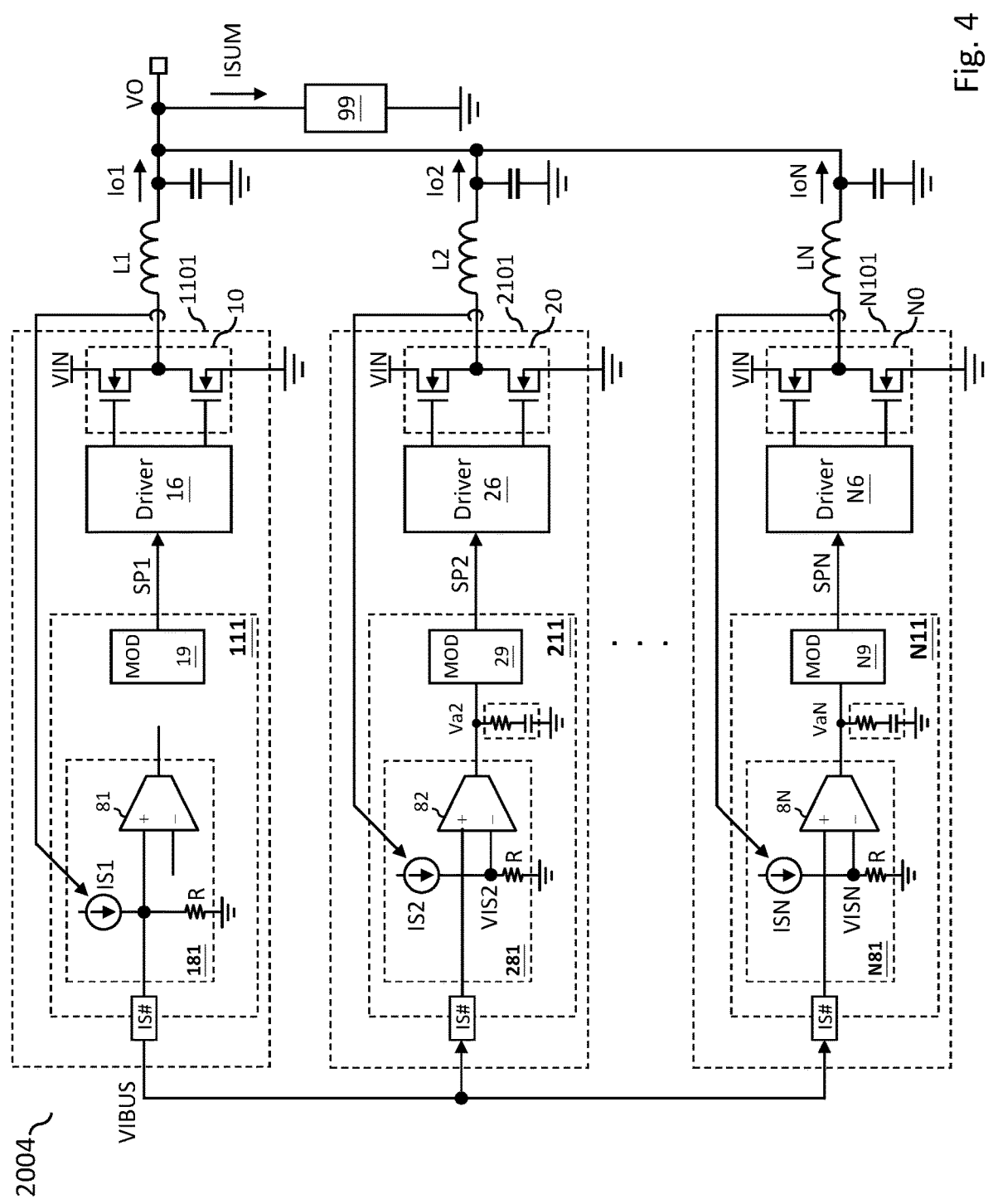
FIG. 4 shows a schematic diagram of a specific embodiment of the current sharing circuit in a stackable multi-phase power converter according to the present invention.

Please refer to FIG. 4, which illustrates a schematic diagram of one specific embodiment of the current sharing circuit in the stackable multi-phase power converter of the present invention. In one embodiment, the current sharing signal VIBUS is generated only according to the corresponding inductor current (e.g., Io1, Io2-ION) of one of the plural inductors (e.g., L1, L2-LN) of the plural stackable sub-converters (1101, 2101-N101). For example, in this embodiment, the current sharing signal VIBUS is generate only according to the inductor current Io1 of the inductor L1 of the stackable sub-converter 1101.

In a preferred embodiment, the conversion control circuit 111 is configured as the master control circuit. In other words, in this embodiment, the current sharing signal VIBUS is generate only according to the inductor current Io1 master control circuit 111. In one preferred embodiment, the current sharing circuit 181 of the master control circuit (i.e., the conversion control circuit 111) does not generate the adjustment signal and does not adjust the at least one parameter of the conversion control circuit 111. On the other hand, the current sharing circuits (281-N81) of the slave control circuits (conversion control circuits 211-N11) generate the adjustment signals (Va2-VaN) respectively to adjust the respective corresponding at least one parameter for current sharing between the plural stackable sub-converters.

Please continue to refer to FIG. 4. In one embodiment, current sharing circuits 181, 281-N81 each include transconductance circuits 81, 82-8N. In one embodiment, in the current sharing circuit 181 of the master control circuit (conversion control circuit 111), the current sharing signal VIBUS is generate according to the sensing current IS1 related to the inductor current Io1 and the resistor R. In the current sharing circuits 281-N81 of the respective slave control circuits (conversion control circuits 211-N11), the transconductance circuits 82-8N generates corresponding adjustment signals Va2-VaN according to the difference between the current sharing signal (VIBUS) and the respective corresponding sub-current sensing signals VIS2-VISN. In one embodiment, the sub-current sensing signals VIS2-VISN of the slave control circuits (conversion control circuits 211-N11) are generated according to the corresponding sensing currents IS2-ISN) and resistors (R), where the sensing currents IS2-ISN are related to the respective corresponding inductor currents Io2-ION.

Note that, as illustrated in the embodiment of FIG. 4, the current sharing signal of the stackable multi-phase power converter can be generated only according to one stackable sub-converter (the master control circuit). Furthermore, other stackable sub-converters (slave control circuits) generate adjustment signals according to their sub-current sensing signals and the current sharing signal to adjust at least one parameter of their corresponding conversion control circuits, thereby achieving current sharing. As a consequence, when there is a change in the activated phase number of the stackable multi-phase power converter, the current sharing signal remains unaffected as well as the balance state of current sharing.

Figure 5:
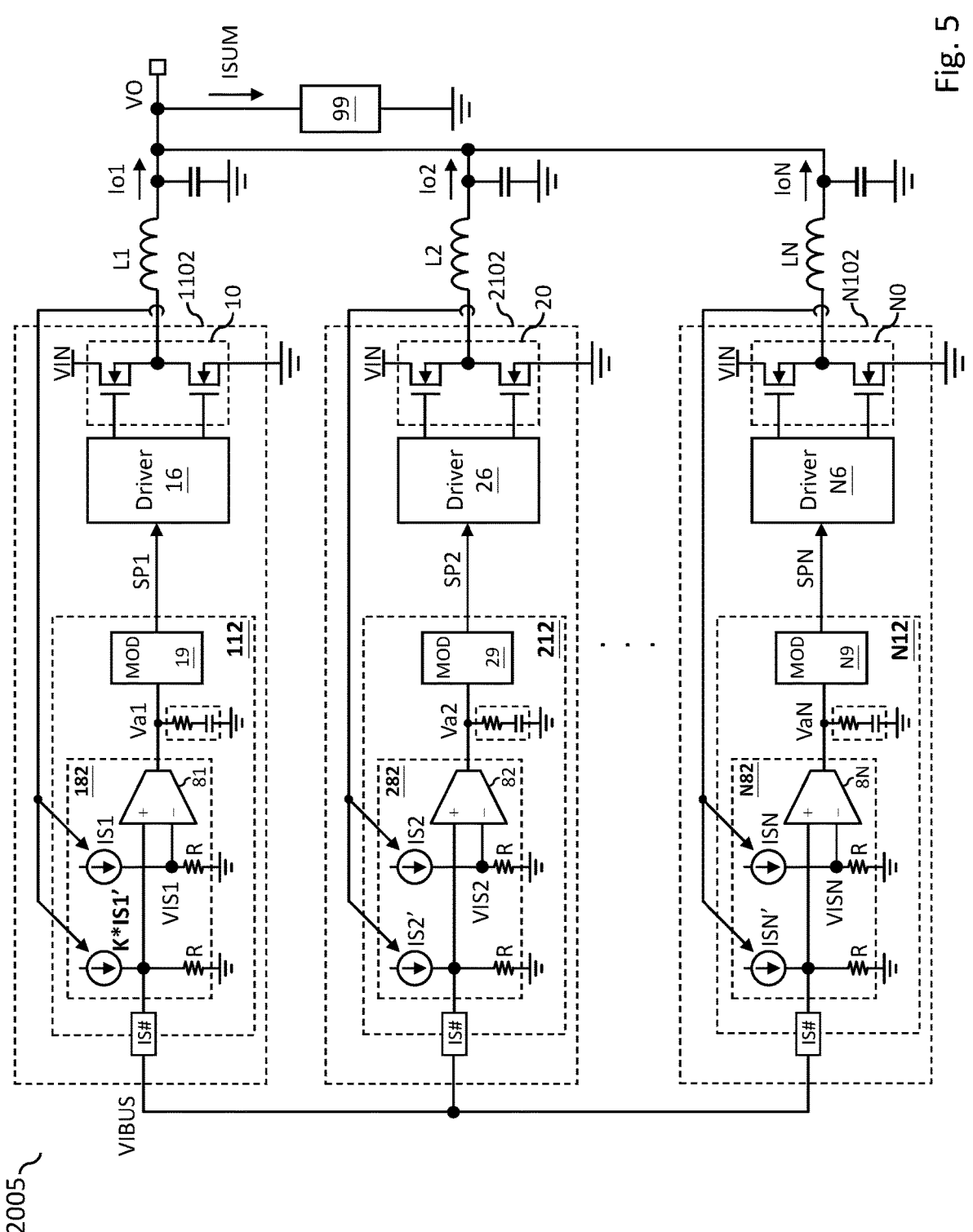
FIG. 5 shows another specific embodiment of the current sharing circuit in a stackable multi-phase power converter according to the present invention.

Please refer to FIG. 5. FIG. 5 illustrates another specific embodiment of the current sharing circuit in the stackable multi-phase power converter of the present invention. In one embodiment, as shown in the configuration of the stackable multi-phase power converter 2005 in FIG. 5, the current sharing signal VIBUS is generated according to the plural inductor currents (e.g., Io1, Io2-ION) corresponding to the plural inductors (e.g., L1, L2-LN) of the plurality of stackable sub-converters (1102, 2102-N102) with corresponding plural activated phases. In one embodiment, a ratio of a portion of the current sharing signal generated by a master control circuit to a portion generated by each activated one of the slave control circuit or the slave control circuits is k. The ratio k relates to a difference between a total phase number Nph_total and the activated phase number Nph_activated. Specifically, k is shown as the following Equation 2:

$$k = \text{Nph\_total} - \text{Nph\_activated} + 1 \qquad \text{(Eq. 2)}$$

In Equation 2, as the output current ISUM level increases, the activated phase number Nph_activated also increases. The activated phase number Nph_activated is less than or equal to the total phase number Nph_total, and Nph_activated is greater than or equal to 2 (there will be no need for current balance when equal to 1).

Specifically, as shown in FIG. 5, in a preferred embodiment, the conversion control circuit 112 is configured as the master control circuit, and the remaining conversion control circuits (e.g., 212-N12) are configured as slave control circuits. The current sharing circuits 182, 282-N82 respectively include transconductance circuits 81, 82-8N. In this embodiment, the current sharing signal VIBUS is generated according to k-fold of the sensing current IS1' (i.e., k×IS1'), the sensing current IS2'-ISN' and the resistor R on all the current sharing terminals IS #of the current sharing circuits 182, 282-N82. The sensing current IS1', IS2'-ISN' are related to the corresponding inductor currents Io1, Io2-ION. In this embodiment, the transconductance circuits 81, 82-8N generate corresponding adjustment signals Va1, Va2-VaN according to the difference between the current sharing signal VIBUS and the corresponding sub-current sensing signals VIS1, VIS2-VISN. These adjustment signals are configured to adjust at least one parameter of the corresponding conversion control circuits 112, 212-N12, achieving current sharing between the stackable sub-converters 1102, 2102-N102. In this embodiment, the sub-current sensing signals VIS1, VIS2-VISN are generated according to the corresponding sensing currents (IS1', IS2'-ISN') and resistances (R), where the sensing currents (IS1', IS2'-ISN') are related to the corresponding inductor currents (Io1, Io2-ION).

Note that, the component of the current sharing signal VIBIS generated by the master control circuit is related to k×IS1', and the component of the current sharing signal VIBUS generated by the slave control circuit (conversion control circuit 212-N12) is related to the sensing currents IS2'-ISN'.

In a specific embodiment where N is equal to 3, the stackable multi-phase power converter 2005 has a total phase number of 3. When the load 99 is heavy (output current ISUM is larger) and the activated phase number is 3, k is equal to 1. Assuming that the resistance values of the resistors R in the current sharing circuits 182, 282-N82 are roughly the same, the voltage level of the current sharing signal VIBUS can be represented by the following Equation 3:

$$VIBUS = (1 \times IS1' + IS2' + IS3') \times (R/3) \qquad \text{(Eq. 3)}$$

In the above embodiment, when the load 99 transitions to a medium load (output current ISUM decreases) with an activated phase number equal to 2, k will be equal to 2. In this case, the voltage level of the current sharing signal VIBUS can be represented by the following Equation 4:

$$VIBUS = (2 \times IS1' + IS2') \times (R/3) \qquad \text{(Eq. 4)}$$

As understood from Equations 3 and 4, in the stackable multi-phase power converter, since the current sharing signal VIBUS is related to k times of the sensing current (k×IS1') of the master control circuit, the balance state of current sharing will not be affected when there is a change in the activated phase number of the stackable multi-phase power converter. For example, when the activated phase number is changed from 3 to 2, the ratio k will be changed from 1 to 2 accordingly. Although the current sharing signal VIBUS lacks of the sensing current IS3' under this situation, the level of the current sharing signal VIBUS is substantially not affected due to the component from the master control circuit becomes 2 times (2×IS1'). Consequently, the balance state of the current sharing can still be maintained and currents and voltages of all phases can be kept stable even during transition of load and phase number.

Figure 6:
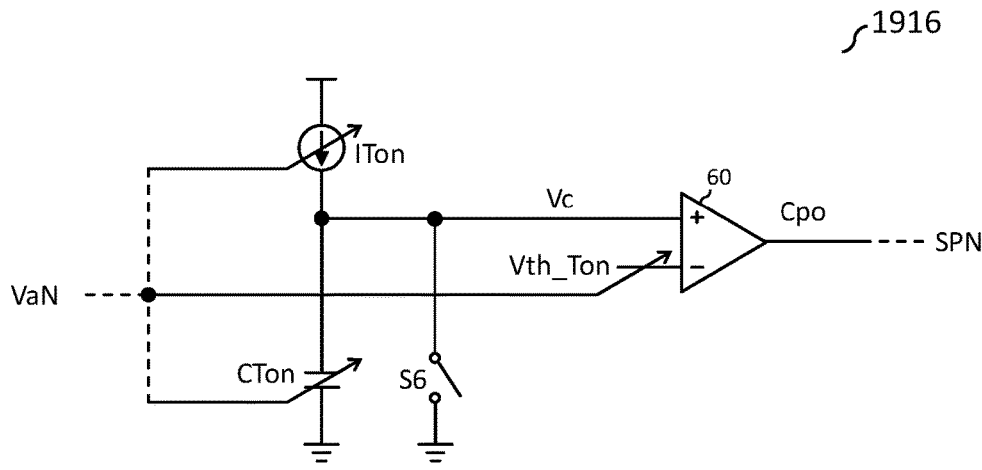
FIG. 6 illustrates a specific embodiment of the constant time generation circuit in a stackable multi-phase power converter according to the present invention.

Please refer to FIG. 6. FIG. 6 illustrates a specific embodiment of the constant time generation circuit in the stackable multi-phase power converter of the present invention. In one embodiment, the modulation circuit N9 includes the constant time generation circuit 1916 shown in FIG. 6. The constant time generation circuit 1916 includes a current source ITon, an integrating capacitor CTon, and a comparator 60. In one embodiment, the comparison signal Cpo is configured to control the conductive state of the switch S6. When the switch S6 is conductive, the integrating voltage Vc on the integrating capacitor CTon is reset, for example, to 0V. When the switch S6 turns off, the constant time generation circuit 1916 starts integrating the current source ITon through the integrating capacitor CTon to generate the integrating voltage Vc. The comparator 60 compares the integrating voltage Vc with the threshold voltage Vth_Ton and generates the comparison signal Cpo.

In one embodiment, the modulation signal SPN controls at least one switch of the power stage circuit of the corresponding stackable sub-converter with a constant time according to the comparison signal Cpo. For example, it controls the constant conduction time of the corresponding power stage circuit. In one embodiment, the constant time is determined according to the threshold voltage Vth_Ton, the capacitance value of the integrating capacitor CTon, or the integrating current of the current source ITon. In one embodiment, the adjustment signal VaN (corresponding to the aforementioned Vadj) is configured to adjust at least one parameter to adjust the constant time, thereby achieving current sharing between plural stackable sub-converters (such as stackable sub-converters 1102, 2102-N102). In this embodiment, as shown in FIG. 6, at least one parameter includes at least one of the threshold voltage Vth_Ton, the capacitance value of the integrating capacitor CTon, and the integrating current of the current source ITon.

Figure 7:
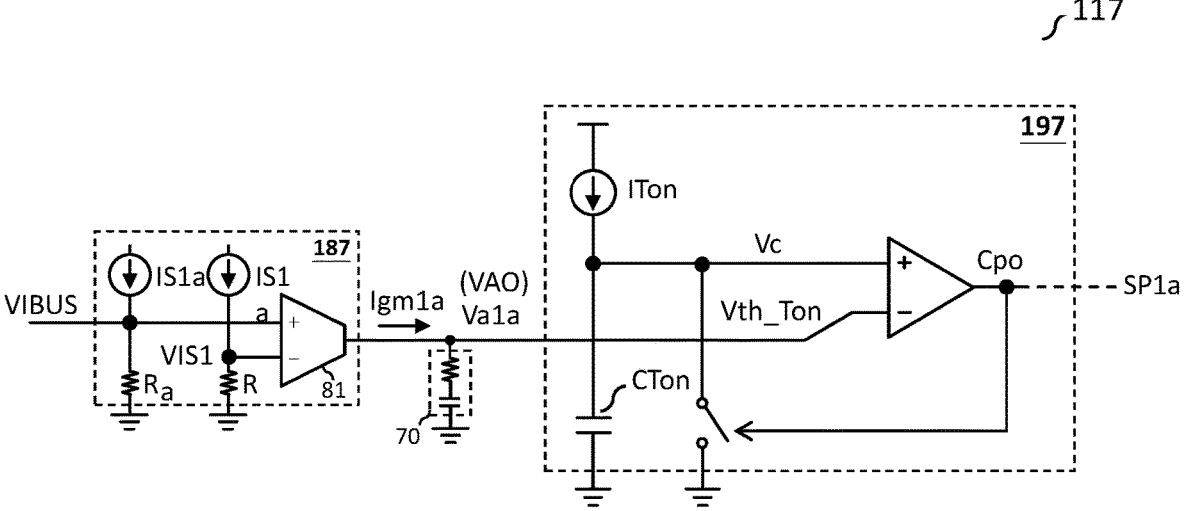
FIG. 7 demonstrates a specific embodiment of the conversion control circuit in a stackable multi-phase power converter according to the present invention.

Please refer to FIG. 7. FIG. 7 illustrates a specific embodiment of the conversion control circuit 117 in the stackable multi-phase power converter of the present invention. In one embodiment, the conversion control circuit 117 includes a current sharing circuit 187, a modulation circuit 197, and a filtering circuit 70. In one embodiment, the transconductance circuit 81 in the current sharing circuit 187 generates a transconductance current Igm1a according to the difference between the current sharing signal VIBUS and the corresponding sub-current sensing signal VIS1a. The sub-current sensing signal VIS1a and the current sharing signal VIBUS are generated according to the sensing currents IS1a and IS1a', where the sensing currents IS1a and IS1a' are related to the corresponding inductor current. In one embodiment, the filtering circuit 70 generates an amplified output signal VAO according to the transconductance current Igm1a. In this embodiment, the adjustment signal Va1a corresponds to the amplified output signal VAO, and the amplified output signal VAO corresponds to the threshold voltage Vth_Ton.

In the embodiment of FIG. 7, the modulation circuit 197 adjusts the threshold voltage Vth_Ton by the adjustment signal Va1a to adjust the modulation signal SP1a. The modulation signal SP1a is configured to control at least one switch in the power stage circuit of the corresponding stackable sub-converter, thereby achieving current sharing between plural stackable sub-converters.

Figure 8:
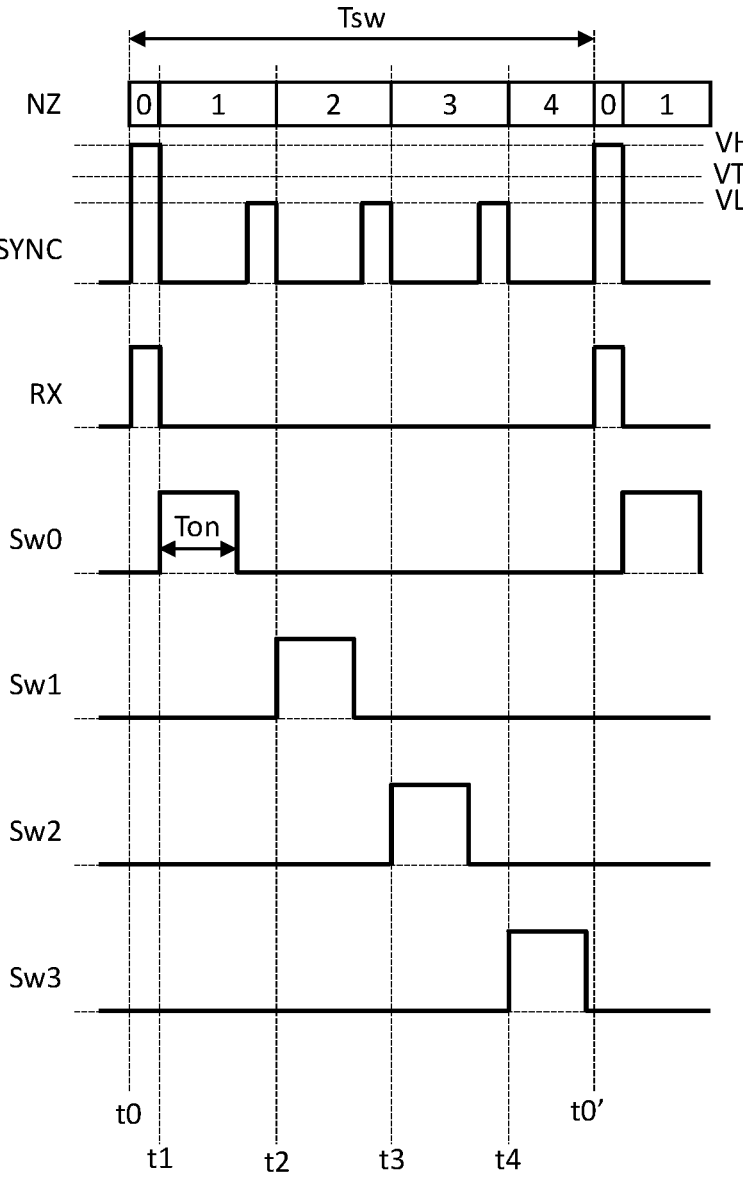
FIG. 8 depicts an operational waveform diagram of one embodiment of the stackable multi-phase power converter according to the present invention.

Please refer to both FIG. 3 and FIG. 8. FIG. 8 illustrates an exemplary operational waveform corresponding to the stackable 4-phase power converter of FIG. 3. In a specific embodiment, the stackable multi-phase power converter 2003 of FIG. 3 has a total phase number of 4, meaning it includes stackable sub-converters 1100, 2100, 3100, 4100. In one embodiment, the stackable sub-converters 1100, 2100, 3100, 4100 have corresponding switching nodes Sw0, Sw1, Sw2-SwZ (in this embodiment, Sw0, Sw1, Sw2, Sw3), where the switching nodes Sw0, Sw1, Sw2-SwZ are nodes coupled to the corresponding power stage circuits via inductors L1, L2, L3-LN. The variable Z is an integer greater than or equal to 1.

In one embodiment, as shown in FIG. 8, the synchronization signal SYNC includes plural pulses, and these pulses are continuously counted as the count value NZ, where the synchronization signal SYNC includes a reset signal RX configured to reset and initiate the count value NZ. In one embodiment, when the count value NZ is related to the phase sequence number ID_Z corresponding to the conversion control circuit, that control conversion circuit enables the corresponding power stage circuit to generate the output power. In one embodiment, the stackable sub-converters are activated through the triggering of the corresponding pulses in the synchronization signal. The operation of the 4-phase stackable multi-phase power converter 2003 will be explained below.

Specifically, as shown in FIG. 3 and FIG. 8, in this embodiment, the phase sequence numbers ID_Z of the conversion control circuits 110, 210, 310, 410 are set to 0, 1, 2, 3, respectively. In one embodiment, during one switching period Tsw, at time to, the synchronization signal SYNC and the reset signal RX are generated (e.g., by the conversion control circuit 110). At this time, the count value NZ for each conversion control circuit 110, 210, 310, 410 is set to 0. At time t1, since the count value NZ is 0 and equal to the phase sequence number ID_Z of the conversion control circuit 110, the falling edge of the synchronization signal SYNC triggers the conversion control circuit 110 to enable the power stage circuit 10, thereby generating the output power to the load 99. For example, by controlling the upper bridge switch of the power stage circuit 10 to conduct, the switching node Sw0 is electrically connected to the input voltage VIN for a conduction time Ton.

Simultaneously, the falling edge of the synchronization signal SYNC increments the count value NZ to 1. It should be noted that the conduction time Ton is determined by the constant time generation circuit.

At time t2, since the count value NZ is 1, the falling edge of the synchronization signal SYNC triggers the conversion control circuit 210 (of which the phase sequence number ID_Z is 1) to enable the power stage circuit 20, thereby generating the output power to the load 99. For example, by controlling the upper bridge switch of the power stage circuit 20 to conduct, the switching node Sw1 is electrically connected to the input voltage VIN for a conduction time Ton. Simultaneously, the falling edge of the synchronization signal SYNC increments the count value NZ to 2.

At time t3, since the count value NZ is 2, the falling edge of the synchronization signal SYNC triggers the conversion control circuit 310 (of which the phase sequence number ID_Z is 2) to enable the power stage circuit 30, thereby generating the output power to the load 99. For example, by controlling the upper bridge switch of the power stage circuit 30 to conduct, the switching node Sw2 is electrically connected to the input voltage VIN for a conduction time Ton. Simultaneously, the falling edge of the synchronization signal SYNC increments the count value NZ to 3.

At time t4, since the count value NZ is 3, the falling edge of the synchronization signal SYNC triggers the conversion control circuit 410 (of which the phase sequence number ID_Z is 3) to enable the power stage circuit 40, thereby generating the output power to the load 99. For example, by controlling the upper bridge switch of the power stage circuit 40 to conduct, the switching node Sw3 is electrically connected to the input voltage VIN for a conduction time Ton. Simultaneously, the falling edge of the synchronization signal SYNC increments the count value NZ to 4.

In one embodiment, when the count value NZ reaches the activated phase number, a reset signal RX is generated. In this embodiment, the maximum value is 4 (the activated phase number). Therefore, when the count value NZ is 4, the rising edge of the synchronization signal SYNC triggers the reset signal RX to reset the count value (e.g., at time to') and start the next cycle of the multi-phase switching.

In another embodiment, as shown in FIG. 8, the rising edge of the synchronization signal SYNC with a higher voltage level (e.g., high level VH) is configured to indicate the reset signal RX, while the other pulses of the synchronization signal SYNC can have a lower voltage level (e.g., low level VL). From one perspective, in this embodiment, the reset signal RX is modulated or mixed in the plural pulses of the synchronization signal SYNC, and the local reset signal RX is generated when the voltage level of the synchronization signal SYNC is higher than a threshold VTH.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be configured together, or, a part of one embodiment can be configured to replace a corresponding part of another embodiment. In view of the foregoing, the spirit of the present invention should cover all such and other modifications and variations, which should be interpreted to fall within the scope of the following claims and their equivalents.

What is claimed is:

1. A conversion control circuit for controlling a stackable sub-converter, wherein a plurality of stackable sub-converters are configured as a stackable multi-phase power converter, wherein each of the plurality of stackable sub-converters includes a power stage circuit and a corresponding conversion control circuit, wherein a plurality of power stage circuits corresponding to the plurality of stackable sub-converters are coupled in parallel to generate an output power to a load, the output power including an output current, wherein the conversion control circuit is configured to control at least one switch of the power stage circuit to switch an inductor corresponding to the power stage circuit, thereby generating the output power, wherein the conversion control circuit is configured as a master control circuit or a slave control circuit, wherein the plurality of stackable sub-converters have a total phase number and an activated phase number, wherein the activated phase number is determined according to a level of the output current, wherein the conversion control circuit comprises:

a current sharing terminal, wherein a current sharing signal is coupled to current sharing terminals of plural conversion control circuits that are coupled in parallel;

a current sharing circuit, configured to generate and/or receive the current sharing signal, and to generate an adjustment signal according to a difference between the current sharing signal and a sub-current sensing signal to adjust at least one parameter of the conversion control circuit for current sharing between the plurality of stackable sub-converters, wherein the sub-current sensing signal is related to an inductor current corresponding to the inductor;

wherein the current sharing circuit includes the following configurations:

(A): wherein the current sharing signal is generated only according to the inductor current corresponding to one of the plurality of stackable sub-converters, wherein the current sharing circuit of the master control circuit does not generate the adjustment signal and does not adjust the at least one parameter of the conversion control circuit, wherein the current sharing circuit of each of the plural slave control circuits generates the adjustment signal to adjust the at least one parameter for current sharing between the plurality of stackable sub-converters; or (B): wherein the current sharing signal is generated according to the inductor currents of the inductors of plural activated phases of the plurality of stackable sub-converters, wherein a ratio of a portion of the current sharing signal generated by the master control circuit to a portion generated by each activated one of plural slave control circuits is k which relates to a difference between the total phase number and the activated phase number.

2. The conversion control circuit as claimed in claim 1, wherein in configuration (A), the current sharing signal is generated only according to the inductor current corresponding to the master control circuit.

3. The conversion control circuit as claimed in claim 2, wherein the conversion control circuit further comprises:

a sync terminal, wherein a sync signal is coupled to plural sync terminals of the plural conversion control circuits that are coupled in parallel;

wherein the sync signal includes plural pulses, the plural pulses are continuously counted as a counting value, wherein the sync signal includes a reset signal for resetting and initiating the counting value;

wherein when the counting value is related to a phase sequence number corresponding to the conversion control circuit, the conversion control circuit enables a corresponding one of the plurality of power stage circuits to generate the output power;

wherein the master control circuit is configured to generate the sync signal via the sync terminal, and the slave control circuit is configured to receive the sync signal via the sync terminal.

4. The conversion control circuit as claimed in claim 3, wherein when the counting value reaches the activated phase number, the reset signal is generated, wherein one pulse of the sync signal with a higher voltage level is indicative of the reset signal.

5. The conversion control circuit as claimed in claim 3, wherein the stackable sub-converter is activated by triggering of a corresponding pulse of the sync signal.

6. The conversion control circuit as claimed in claim 3, wherein the conversion control circuit is configured as an integrated circuit, wherein the sync terminal corresponds to a sync pin of the integrated circuit, and the current sharing terminal corresponds to a current sharing pin of the integrated circuit.

7. The conversion control circuit as claimed in claim 1, wherein in the configuration (B), the current sharing circuit of each of the master control circuit and the slave control circuit generates the adjustment signal to correspondingly adjust the at least one parameter, for current sharing between the plurality of stackable sub-converters.

8. The conversion control circuit as claimed in claim 1, wherein the conversion control circuit controls at least one switch of one of the plurality of stackable sub-converters using a constant time, wherein the constant time is determined according to a threshold voltage, an integral capacitance value, or an integral current; wherein the adjustment signal is configured to adjust the at least one parameter to modify the constant time for current sharing between the plurality of stackable sub-converters, wherein the at least one parameter includes at least one of the threshold voltage, the integral capacitance value, and the integral current.

9. The conversion control circuit as claimed in claim 8, further comprising a transconductance circuit and a filtering circuit, wherein the transconductance circuit is configured to generate a transconductance current according to the difference between the current sharing signal and the sub-current sensing signal, and the filtering circuit is configured to generate an amplified output signal according to the transconductance current, wherein the adjustment signal corresponds to the amplified output signal, and the amplified output signal corresponds to the threshold voltage.

10. A control method, for controlling a stackable sub-converter, wherein a plurality of stackable sub-converters are configured as a stackable multi-phase power converter, wherein each of the plurality of stackable sub-converters includes a power stage circuit, wherein a plurality of power stage circuits corresponding to the plurality of stackable sub-converters are coupled in parallel to generate an output power to a load, wherein the power stage circuit includes at least one switch for switching an inductor corresponding to the power stage circuit, thereby generating the output power, wherein one of the plurality of stackable sub-converters is configured as a master stackable sub-converter, and each of others of the plurality of stackable sub-converters is configured as a slave stackable sub-converter, wherein the plurality of stackable sub-converters have a total phase number and an activated phase number, wherein the control method comprises:

controlling the at least one switch of the power stage circuit for switching the inductor;

generating or receiving a current sharing signal by each of the plurality of stackable sub-converters; and performing current sharing between the plurality of stackable sub-converters according to the current sharing signal according to a difference between the current sharing signal and a sub-current sensing signal, wherein the sub-current sensing signal is related to an inductor current corresponding to the inductor;

wherein the step of generating the current sharing signal includes the following configurations:

(A): generating the current sharing signal only according to the inductor current corresponding to one of the plurality of stackable sub-converters, wherein the power stage circuit of the master stackable sub-converter is not adjusted, wherein a corresponding one of the plurality of power stage circuits of each of slave stackable sub-converters is adjusted to adjust corresponding at least one parameter for current sharing between the plurality of stackable sub-converters; or (B): generating the current sharing signal according to the inductor currents of the inductors of plural activated phases of the plurality of stackable sub-converters, wherein a ratio of a portion of the current sharing signal generated by the master stackable sub-converter to a portion generated by each activated one of the slave stackable sub-converter or the slave stackable sub-converters is k which relates to a difference between the total phase number and the activated phase number.

11. The control method as claimed in claim 10, wherein in the configuration (A), the current sharing signal is generated only according to the corresponding inductor current corresponding to the master stackable sub-converter.

12. The control method as claimed in claim 11, further comprising:

generating a sync signal by the master stackable sub-converter;

receiving the sync signal by the slave stackable sub-converter, wherein the sync signal includes plural pulses, the plural pulses are continuously counted as a counting value, wherein the sync signal includes a reset signal for resetting and initiating the counting value; and enabling a corresponding power stage circuit to generate the output power when the counting value is related to a corresponding phase sequence number.

13. The control method as claimed in claim 12, further comprising:

indicating the reset signal by one pulse of the sync signal with a higher voltage level; and generating the reset signal when the counting value reaches the activated phase number.

14. The control method as claimed in claim 12, further comprising: activating the stackable sub-converter by triggering of a corresponding pulse of the sync signal.

15. The control method as claimed in claim 10, wherein in the configuration (B), generating a corresponding adjustment signal for each of the master stackable sub-converter and the slave stackable sub-converter to correspondingly adjust at least one parameter, for current sharing between the plurality of stackable sub-converters.

16. The control method as claimed in claim 10, further comprising:

controlling the at least one switch of one of the plurality of stackable sub-converters using a constant time, wherein the constant time is determined according to a threshold voltage, an integral capacitance value, or an integral current; and adjusting at least one parameter to modify the constant time for current sharing between the plurality of stackable sub-converters, wherein the at least one parameter includes at least one of the threshold voltage, the integral capacitance value, and the integral current.

17. The control method as claimed in claim 16, further comprising:

generating a transconductance current according to the difference between the current sharing signal and the sub-current sensing signal; and generating an amplified output signal according to the transconductance current, wherein the amplified output signal corresponds to the threshold voltage.

* * * * *